United States Patent
Cheng et al.

(10) Patent No.: US 8,979,114 B2
(45) Date of Patent: Mar. 17, 2015

(54) COLLAPSIBLE INFANT CARRIER APPARATUS AND ITS OPERATING METHOD

(71) Applicant: Wonderland Nurserygoods Company Limited, Central Hong Kong (HK)

(72) Inventors: Chin Ming Cheng, Central Hong Kong (HK); Shun-Min Chen, Central Hong Kong (HK); Yun-Ju Chen, Central Hong Kong (HK)

(73) Assignee: Wonderland Nurserygoods Company Limited, Hong Kong (HK)

( * ) Notice: Subject to any disclaimer, the term of this patent is extended or adjusted under 35 U.S.C. 154(b) by 0 days.

(21) Appl. No.: 13/678,618

(22) Filed: Nov. 16, 2012

(65) Prior Publication Data

US 2013/0134692 A1     May 30, 2013

Related U.S. Application Data

(60) Provisional application No. 61/560,807, filed on Nov. 17, 2011.

(51) Int. Cl.
| | |
|---|---|
| *B62B 1/00* | (2006.01) |
| *B62B 7/06* | (2006.01) |
| *B62B 7/08* | (2006.01) |
| *B62B 7/14* | (2006.01) |

(52) U.S. Cl.
CPC . *B62B 7/062* (2013.01); *B62B 7/08* (2013.01); *B62B 7/142* (2013.01); *B62B 7/064* (2013.01)
USPC ............................................. 280/642

(58) Field of Classification Search
CPC ............... B62B 7/06; B62B 7/08; A61G 5/08
USPC ................................................... 280/650, 649
See application file for complete search history.

(56) References Cited

U.S. PATENT DOCUMENTS

| | | | |
|---|---|---|---|
| 6,086,086 A | 7/2000 | Hanson et al. | |
| 7,419,181 B2 | 9/2008 | Kassai et al. | |
| 8,087,689 B2 | 1/2012 | Fritz et al. | |
| 2006/0237949 A1 | 10/2006 | Hou et al. | |
| 2010/0230933 A1* | 9/2010 | Dean et al. | 280/647 |

FOREIGN PATENT DOCUMENTS

| | | |
|---|---|---|
| CN | 1322651 A | 11/2001 |
| CN | 101954920 A | 1/2011 |
| EP | 0567422 A1 | 10/1993 |
| EP | 2495152 A1 | 9/2012 |
| GB | 2443070 A | 4/2008 |
| WO | 2010099262 A1 | 9/2010 |

* cited by examiner

*Primary Examiner* — John Walters
*Assistant Examiner* — James Triggs
(74) *Attorney, Agent, or Firm* — David I. Roche; Baker & McKenzie LLP

(57) ABSTRACT

An infant carrier apparatus includes a support frame and a seat. The support frame includes at least one latch assembly, the latch assembly being operable between a locking state where the latch assembly locks the support frame in an unfolded state, and an unlocking state to allow folding of the support frame. The seat is operable to attach with and detach from the support frame, wherein the seat includes a driving part that is connectable with the latch assembly when the seat is installed on the support frame, and the driving part is operable to cause displacement of the latch assembly from the locking state to the unlocking state. In some embodiments, a method of operating the infant carrier apparatus is also described.

22 Claims, 18 Drawing Sheets

COLLAPSIBLE INFANT CARRIER APPARATUS AND ITS OPERATING METHOD

CROSS-REFERENCE TO RELATED APPLICATION

This application claims priority to U.S. Provisional Patent Application No. 61/560,807 filed on Nov. 17, 2011, incorporated herein by reference.

BACKGROUND

1. Field of the Invention

The present inventions relate to infant carrier apparatuses and method of operating the same.

2. Description of the Related Art

Most currently available infant stroller apparatuses include mechanisms for collapsing the stroller frame. For folding the stroller frame, an actuator on the handle of the stroller frame can be operated to unlock the latching connections between the different tube segments of the stroller frame. However, the conventional construction for folding the stroller frame is complex, and requires the use of two hands to unlock the latching connections and fold the stroller frame.

Therefore, there is a need for an infant carrier apparatus that can be easy to operate, and address the aforementioned issues.

SUMMARY

The present application describes an infant carrier apparatus and a method of operating the same. In some embodiments, the infant carrier apparatus includes a support frame and a seat. The support frame includes at least one latch assembly, the latch assembly being operable between a locking state where the latch assembly locks the support frame in an unfolded state, and an unlocking state to allow folding of the support frame. The seat is operable to attach with and detach from the support frame, wherein the seat includes a driving part that is connectable with the latch assembly when the seat is installed on the support frame, and the driving part is operable to cause displacement of the latch assembly from the locking state to the unlocking state.

In other embodiments, the method of operating the infant carrier apparatus includes providing a support frame including a latch assembly, the latch assembly being operable between a locking state where the latch assembly locks the support frame in an unfolded state, and an unlocking state where the latch assembly unlocks the support frame to permit its collapsing; providing a seat having a driving part; installing the seat on the support frame such that the driving part is connected with the latch assembly; moving the driving part to switch the latch assembly from the locking state to the unlocking state; and collapsing the support frame.

In other embodiments, an infant carrier apparatus includes two front legs and two rear legs that are respectively disposed on left and right sides of the infant carrier apparatus, two front tube segments and two rear tube segments that are respectively disposed on the left and right sides of the infant carrier apparatus to form a seat frame, a shaft assembled with the front and rear tube segments to define a pivot axis extending transversally about which the rear tube segments are operable to rotate relative to the front tube segments, a transversal support tube extending substantially parallel to the shaft and affixed with the two rear tube segments, and two latch assemblies and a spring respectively mounted with the support tube, the spring being disposed between the two latch assemblies. The front and rear tube segments at each of the left and right sides are pivotally connected with each other, the front tube segment further being pivotally connected with the associated front leg, and the rear tube segment further being pivotally connected with the associated rear leg. The spring is operable to urge the latch assemblies to move transversally in opposite directions to engage the front and rear tube segments for blocking rotation of the rear tube segments relative to the front tube segments.

DETAILED DESCRIPTION OF THE EMBODIMENTS

Figure 1:
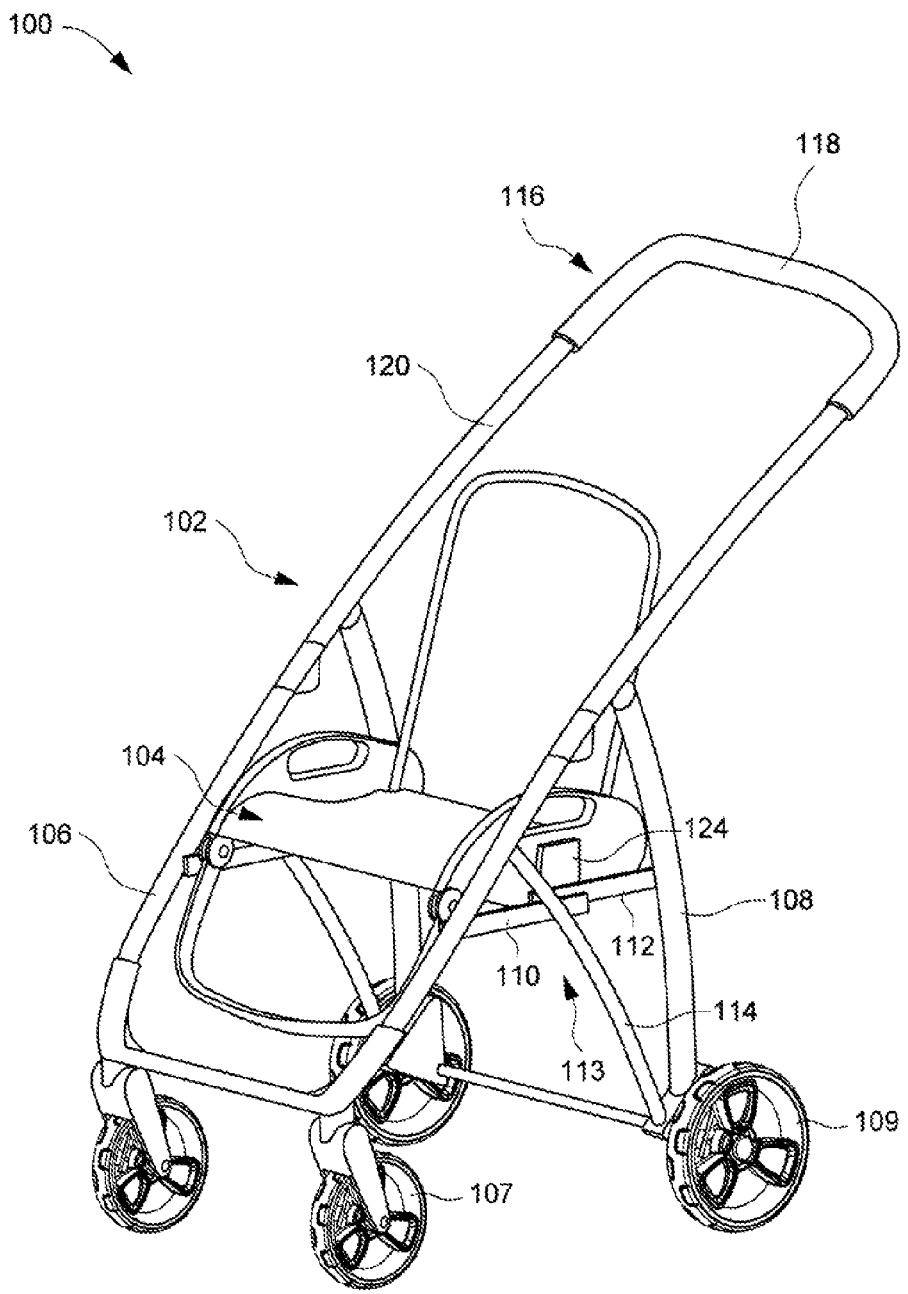
FIG. 1 is a perspective view illustrating an embodiment of a collapsible infant carrier apparatus.

FIG. 1 is a perspective view illustrating an embodiment of a collapsible infant carrier apparatus 100. The infant carrier apparatus 100 can be exemplary an infant stroller, and can include a support frame 102, and a seat 104 installable with the support frame 102. The support frame 102 can include two front legs 106, two rear legs 108, a seat frame 113 formed from the assembly of two front tube segments 110 and two rear tube segments 112 respectively extending along the left and right sides of the support frame 102, and a handle 116 of a U-shape. The U-shaped handle 116 can include a transverse segment 118, and left and right side segments 120 respectively connected with two opposite sides of the transverse segment 118. The front legs 106 and rear legs 108 can have upper end portions respectively connected pivotally with the side segments 120 of the handle 116, and lower end portions respectively mounted with front wheels 107 and rear wheels 109. Moreover, two bar linkages 114 can be respectively connected between the front and rear legs 106 and 108 on the left and right sides, each bar linkage 114 including a first end pivotally connected with the associated front leg 106 and a second end pivotally connected with a lower portion of the associated rear leg 108.

The front tube segments 110 and the rear tube segments 112 can respectively have an elongated shape, and can be pivotally connected with each other on the left and right sides of the support frame 102. Each front tube segment 110 can have a front end pivotally connected with one corresponding front leg 106, and each rear tube segment 112 can have a rear end pivotally connected with one corresponding rear leg 108. The seat frame 113 formed by the assembly of the front and rear tube segments 110 and 112 can be detachably assembled with the seat 104. When the infant carrier apparatus 100 is collapsed, the front and rear tube segments 110 and 112 of the seat frame 113 can be driven by the front and rear legs 106 and 108 to fold onto each other.

Figure 2:
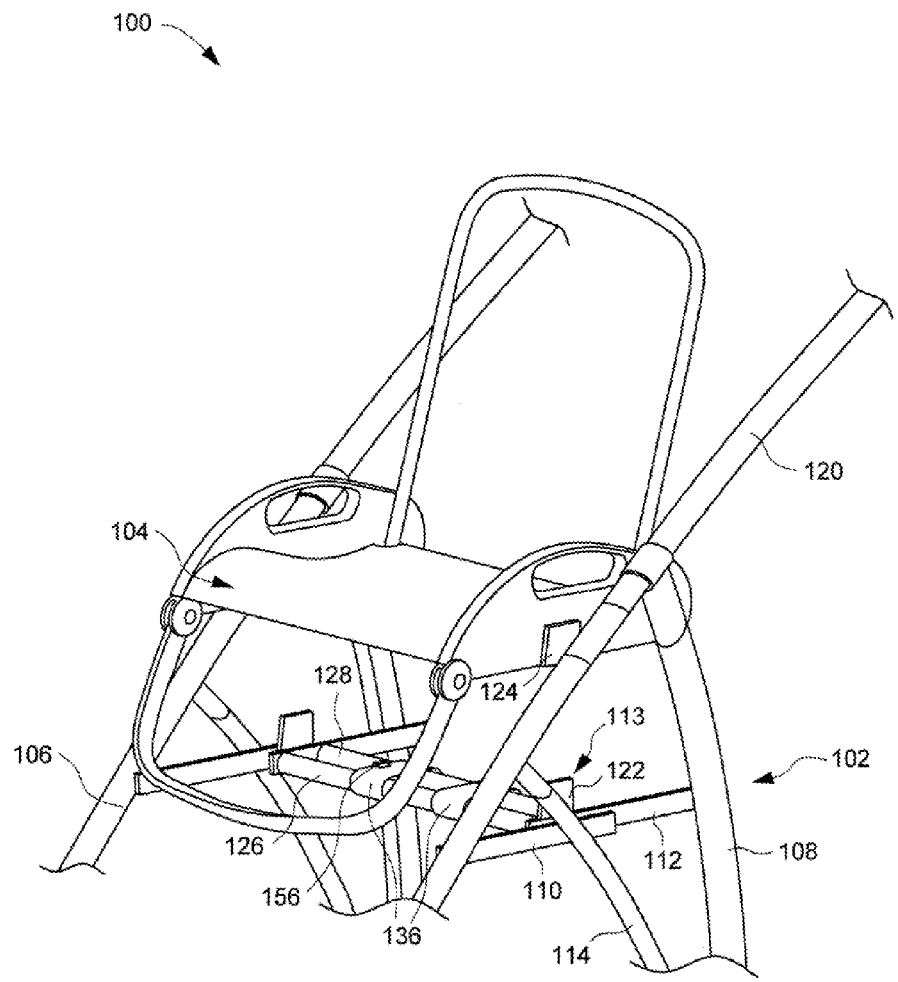
FIG. 2 is a schematic view illustrating a seat detached from a seat frame in the infant carrier apparatus.

FIG. 2 is a schematic view illustrating the seat 104 detached from the seat frame 113. Each of the rear tube segments 112 on the left and right sides can respectively include a first coupling part 122 disposed adjacent to the associated front tube segment 110, and each of the left and right sides of the seat 104 can be respectively provided with a second coupling part 124 associated with the first coupling part 122. The first coupling parts 122 can respectively engage with the second coupling parts 124 when the seat 104 is installed on the support frame 102 (as shown in FIG. 1).

Figure 3:
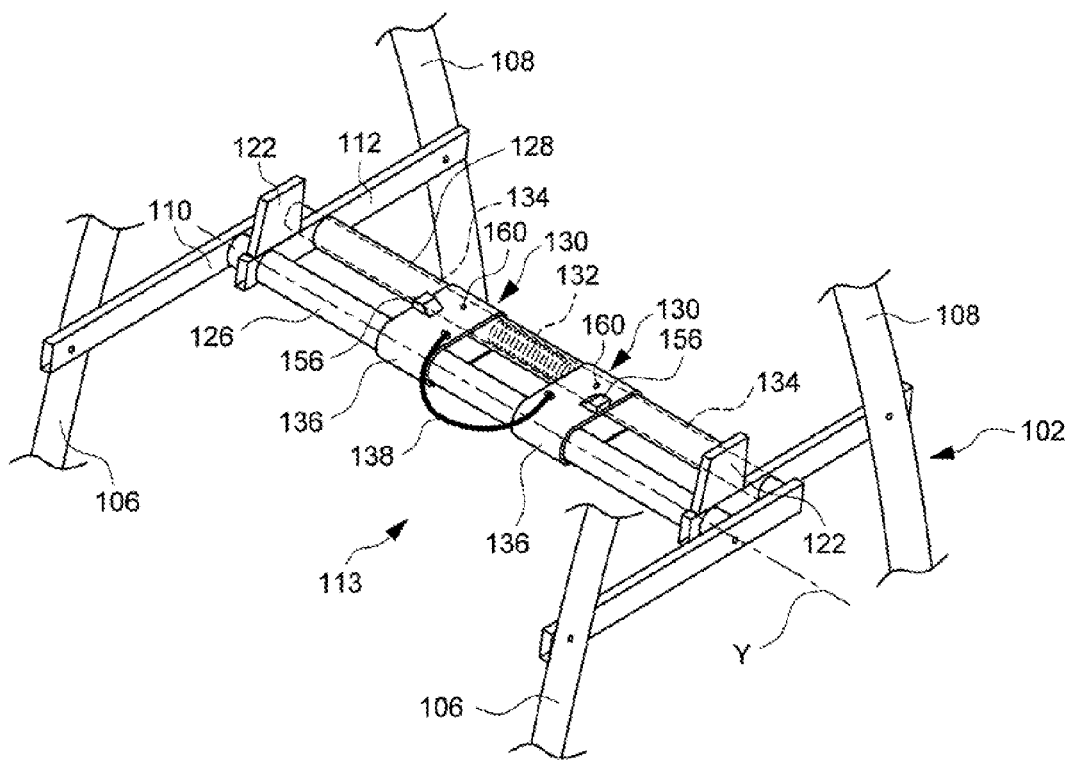
FIG. 3 is a schematic view illustrating the seat frame without the seat installed thereon.

FIG. 3 is a schematic view illustrating the seat frame 113 without the seat 104 installed thereon. The front and rear tube segments 110 and 112 on the left and right sides can be pivotally connected with each other via a transversal shaft 126, and can extend substantially lengthwise from a front toward a rear of the support frame 102. For realizing the pivotal connection between the front and rear tube segments 110 and 112, each of the front and rear tube segments 110 and 112 can respectively include a hole through which the transversal shaft 126 can be respectively mounted parallel to a width of the support frame 102. The transversal shaft 126 can thereby define a pivot axis Y about which the rear tube segments 112 can rotate relative to the front tube segments 110 when the support frame 102 is unfolded and collapsed.

The seat frame 113 can also include a transversal support tube 128 that extends parallel to the transversal shaft 126 across the width of the support frame 102 and has two opposite ends respectively affixed with the two rear tube segments 112.

The seat frame 113 can include two latch assemblies 130, and a spring 132 connected between the two latch assemblies 130. The latch assemblies 130 and the spring 132 can be arranged on the transversal support tube 128. When the support frame 102 is unfolded, the two latch assemblies 130 can be urged by the spring 132 to slide transversally along the transversal support tube 128 away from each other, such that the latch assemblies 130 can respectively pass through the rear tube segment 112 and engage with the front tube segments 110. As a result, rotation of the rear support tubes 112 about the pivot axis Y relative to the front tube segments 110 can be blocked.

When the seat frame 113 is to be unlocked, the latch assemblies 130 can be driven to move toward a center of the seat frame 113. As a result, the spring 132 can be compressed, and the latch assemblies 130 can respectively disengage from the front tube segments 110. The rear tube segments 112 then can rotate about the pivot axis Y relative to the front tube segments 110 to the folded state.

Figure 4:
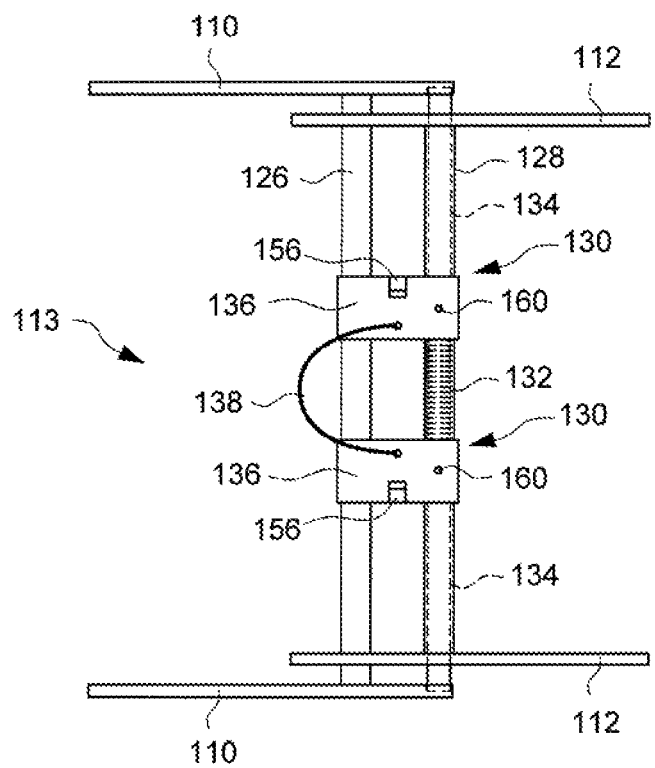
FIGS. 4 and 5 are schematic top views respectively illustrating latch assemblies of the seat frame in locking and unlocking states.
Figure 5:
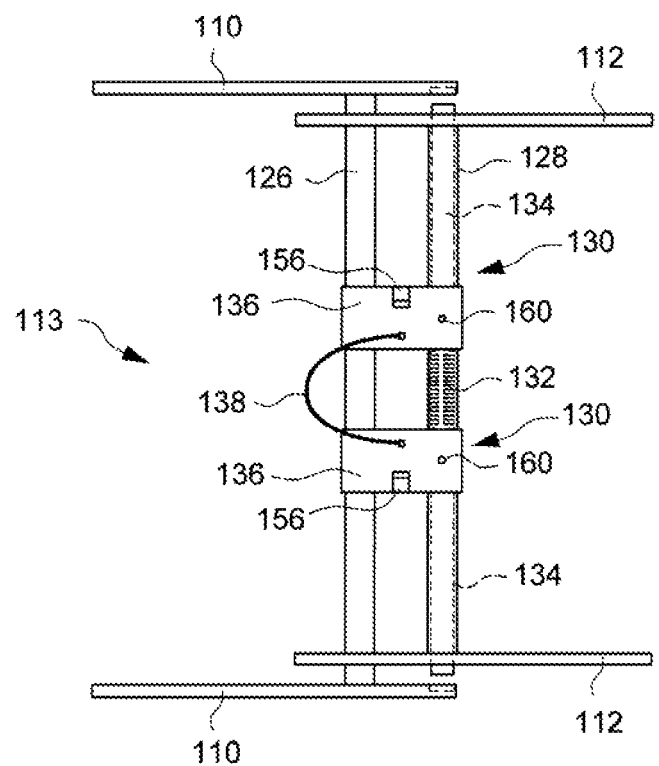

FIGS. 4 and 5 are schematic top views respectively illustrating the latch assemblies 130 of the seat frame 113 in locking and unlocking states (the second coupling parts 124 have been omitted in FIGS. 4 and 5 for clarity). Each of the latch assemblies 130 can include a latch 134 (shown with dotted lines) and a connecting part 136. The latch 134 can have an elongated shape, and can be assembled through the transversal support tube 128. The latches 134 can be movable along the transversal support tube 128 in opposite directions to respectively engage through the rear tube segments 112 with the front tube segments 110, or disengage from the front tube segments 110. Rotation of the rear tube segments 112 relative to the front tube segments 110 can be blocked when the latches 134 are engaged with the front tube segments 110, and rotation of the rear tube segments 112 relative to the front tube segments 110 can be permitted when the latches 134 are disengaged from the front tube segments 110.

The spring 152 can be connected between the two latches 134, and can be operable to bias the latches 134 to the locking state.

Each of the connecting parts 136 can formed with a collar shape that can wrap around the outer surfaces of the transversal shaft 126 and transversal support tube 128, and can be respectively affixed with one associated latch 134. Accordingly, the connecting parts 136 and the latch 134 associated therewith can transversally slide in unison. It is worth noting that the connecting parts 136 may have any shape different from the collar shape, such as plate shapes, semi-elliptical shape, etc.

For facilitating the unlocking operation, the latch assemblies 130 can be respectively connected with an actuator 138. In one embodiment, the actuator 138 can be a strap. The actuator 138 can have two opposite ends respectively affixed with the connecting parts 136. When the actuator 138 is pulled upward, the latch assemblies 130 can move toward each other to the unlocking state. It is worth noting that the latch assemblies 130 may be operated according to other different ways to unlock. For example, the connecting parts 136 or the latches 134 may include extensions that may be accessible for manual operation to displace the latch assemblies 130 to the unlocking state.

Figure 6:
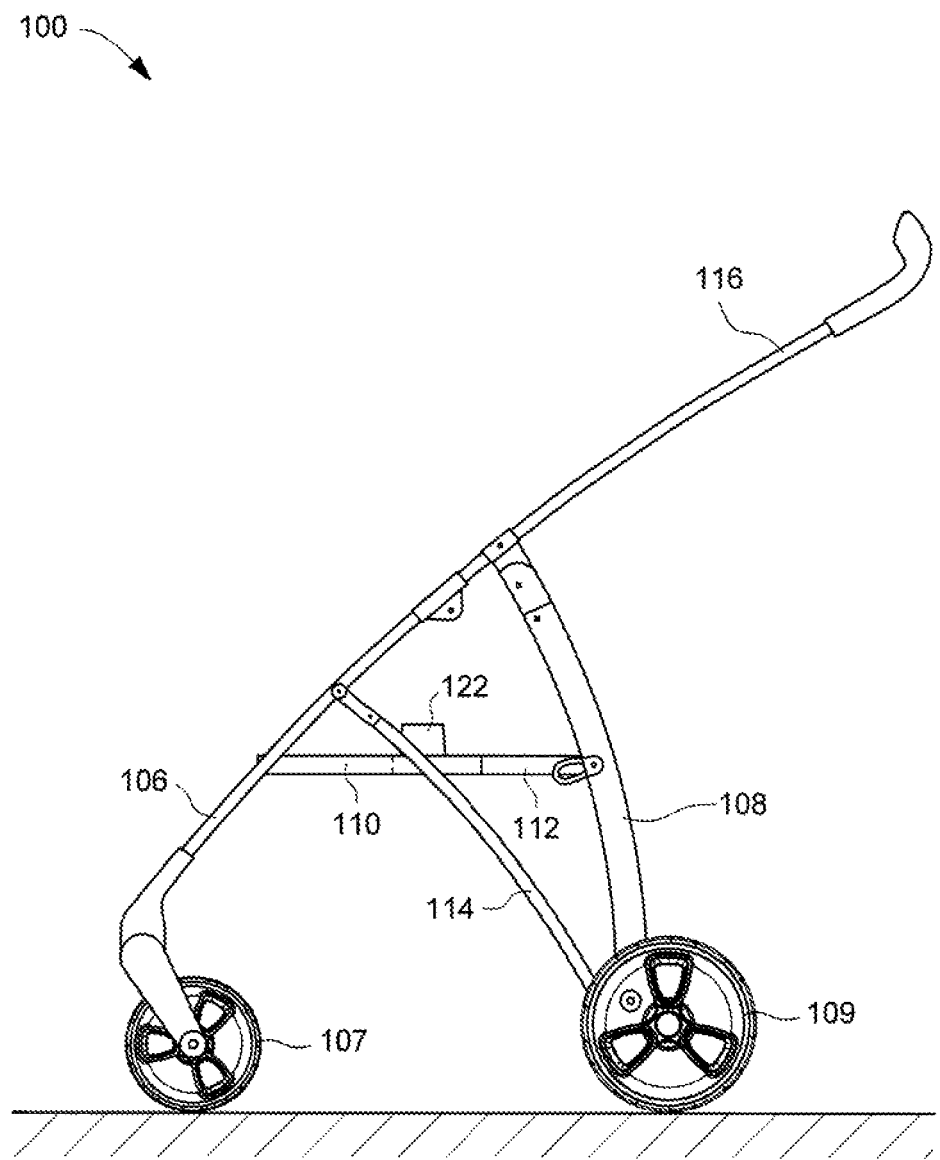
FIGS. 6 through 8 are schematic views illustrating intermediate stages in collapsing the support frame without the seat installed thereon.
Figure 7:
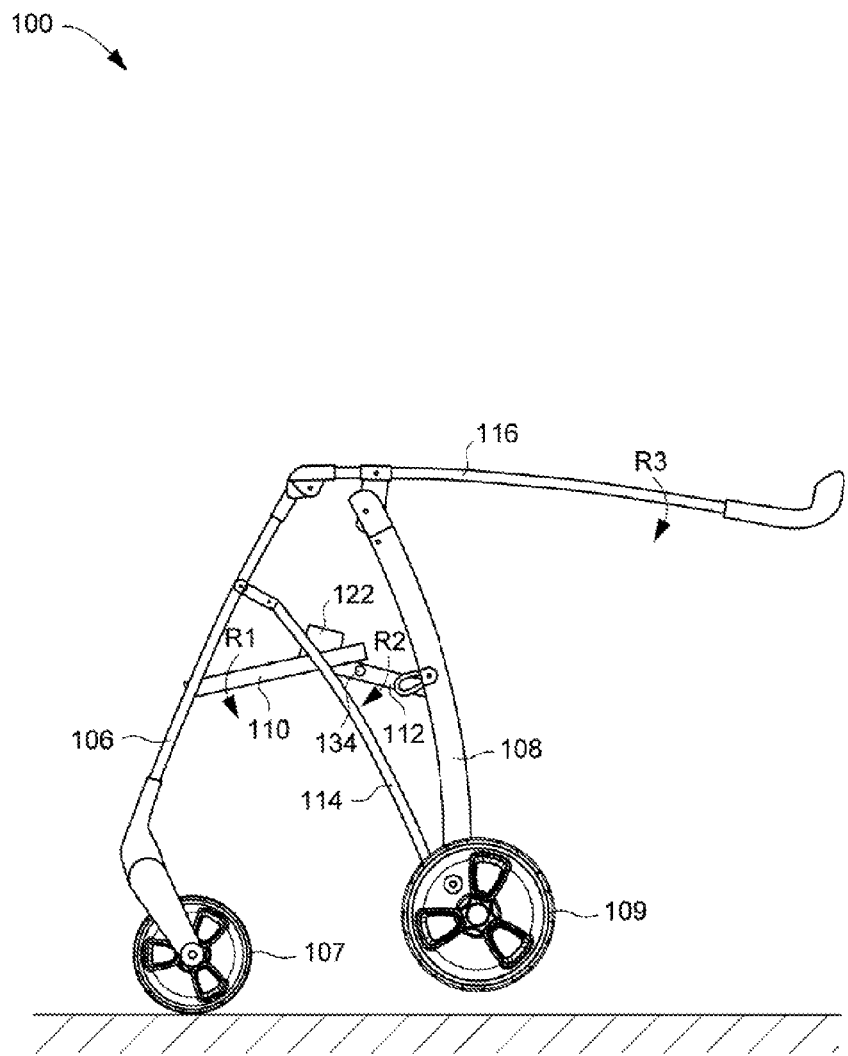
Figure 8:
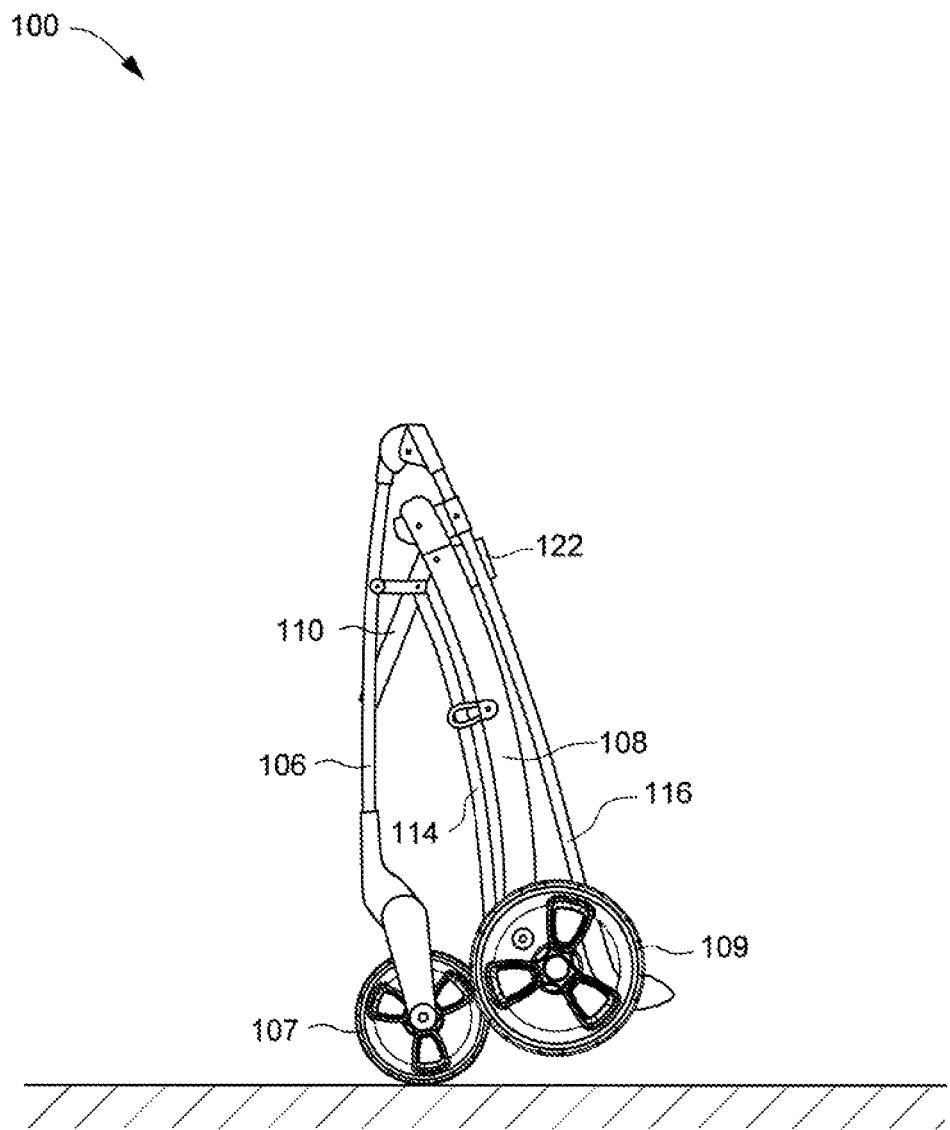

FIGS. 6 through 8 are schematic views illustrating intermediate stages in collapsing the support frame 102 without the seat 104 installed thereon. The actuator 138 can be pulled upward to drive the latches 134 to disengage from the front tube segments 110. While the actuator 138 is pulled upward, the support frame 102 can also be raised above the ground. Owing to its weight, the support frame 102 can self collapse: the front tube segments 110 and the front legs 106 can rotate in a direction R1, and the rear tube segments 112 and the rear legs 108 can rotate in a direction R2 opposite to R1. As a result, the front and rear legs 106 and 108, and the front and rear tube segments 110 and 112 can respectively fold onto each other. As the front legs 106 are folding onto the rear legs 108, the bar linkages 114 can concurrently rotate in the direction R2, and the handle 116 can fold in a direction R3 toward a rear of the support frame 102. As shown in FIG. 8, once the infant carrier apparatus 100 is completely collapsed, the rear legs 108, the handle 116 and the bar linkages 114 can be substantially parallel and adjacent to one another, and the collapsed infant carrier apparatus 100 can stand by itself on the ground.

The infant carrier apparatus 100 can also be collapsed while the seat 104 remains installed on the seat frame 113. For facilitating the unlocking operation, the seat 104 can include a driving mechanism that can be coupled with the latch assemblies 130 when the seat 104 is installed with the seat frame 113. Accordingly, a caregiver can manually actuate the driving mechanism provided on the seat 104 to unlock the latch assemblies 130. An embodiment of the driving mechanism provided on the seat 104 is described hereafter with reference to FIGS. 9 through 12.

Figure 9:
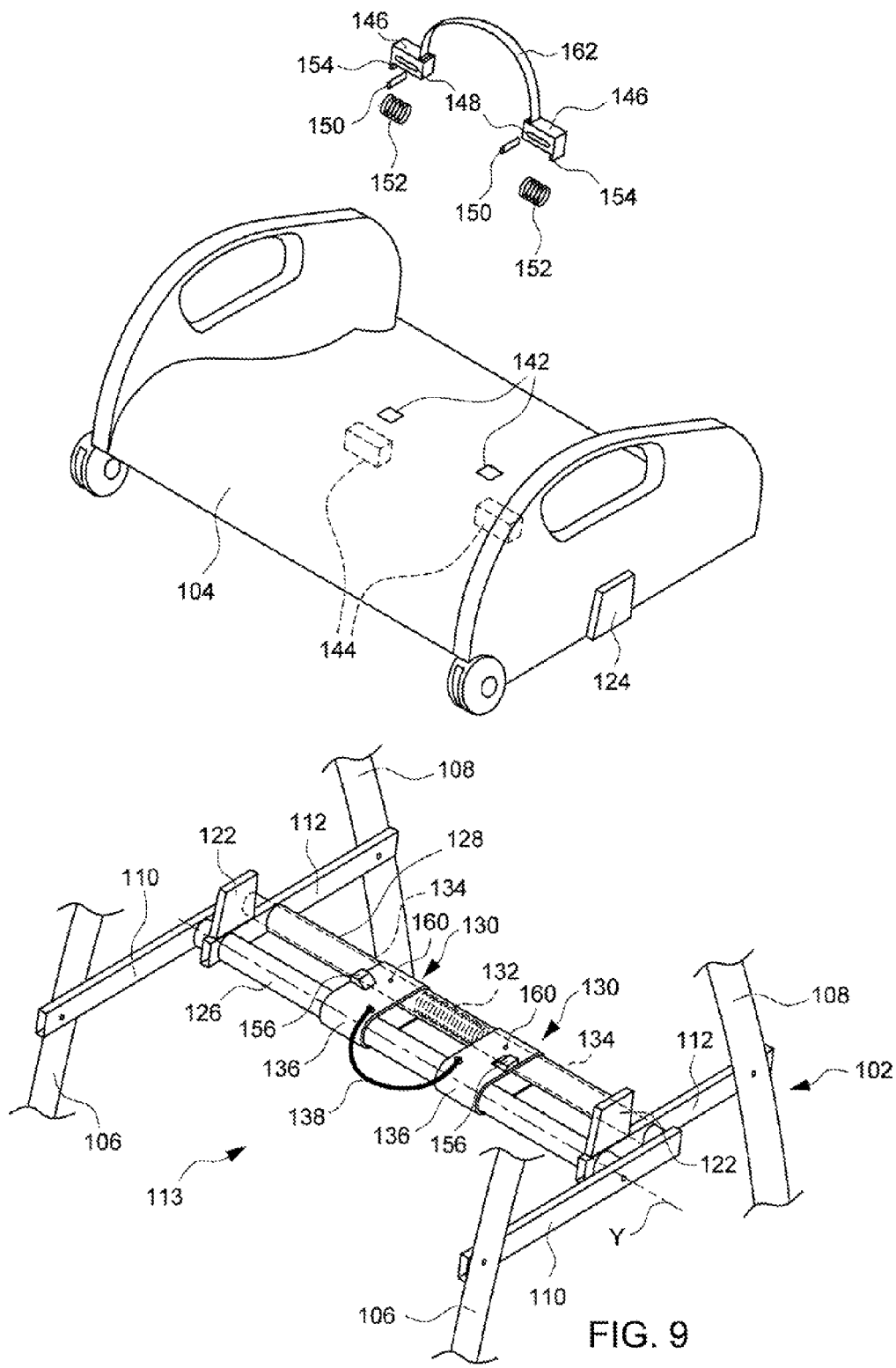
FIG. 9 is a schematic view illustrating the seat detached from the seat frame.
Figure 10:
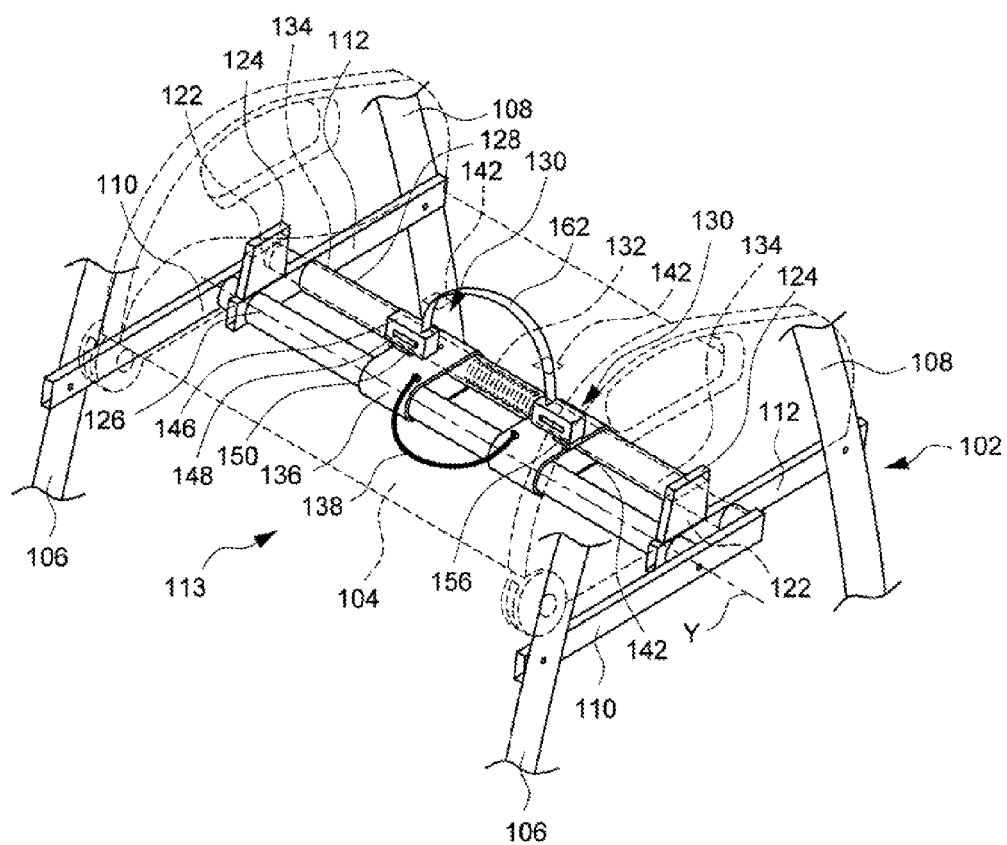
FIG. 10 is a schematic view illustrating the seat affixed with the seat frame.

FIG. 9 is a schematic view illustrating the seat 104 detached from the seat frame 113, and FIG. 10 is a schematic view illustrating the seat 104 (shown with dotted lines) affixed with the seat frame 113. The seat 104 can be exemplary made of a rigid frame. An upper surface of the seat 104 can include two spaced-apart openings 142 and a lower portion of the seat 104 can include two mount structures 144 that are respectively located under the openings 142. In some embodiments, each of the mount structures 144 can respectively include sidewalls that define an inner cavity in which one driving part 146 can be movably assembled. Each of the driving parts 146 can have two opposite sides respectively provided with elongated slots 148 (only one is shown in the figure for clarity). A shaft 150 can be movably passed through the two elongated slots 148 of each driving part 146, and affixed with two opposite sidewalls of the mount structure 144. A spring 152 can also be mounted in each driving part 146. The spring 152 can have two opposite ends respectively connected with the shaft 150 and an inner sidewall of the driving part 146. With the movable assembly of the shaft 150 through the elongated slots 148, each driving part 146 can transversally move in the mount structure 144 relative to the seat 104.

Each of the driving parts 146 can include a flange 154 extending downward. For example, the flange 154 can extend downward outside the mount structure 144. Each connecting part 136 can correspondingly include a raised portion 156 protruding upward near an edge of the connecting part 136. When the seat 104 is installed on the seat frame 113, the flanges 154 can protrude outside the mount structures 144, and respectively contact against the raised portions 156.

Figure 11:
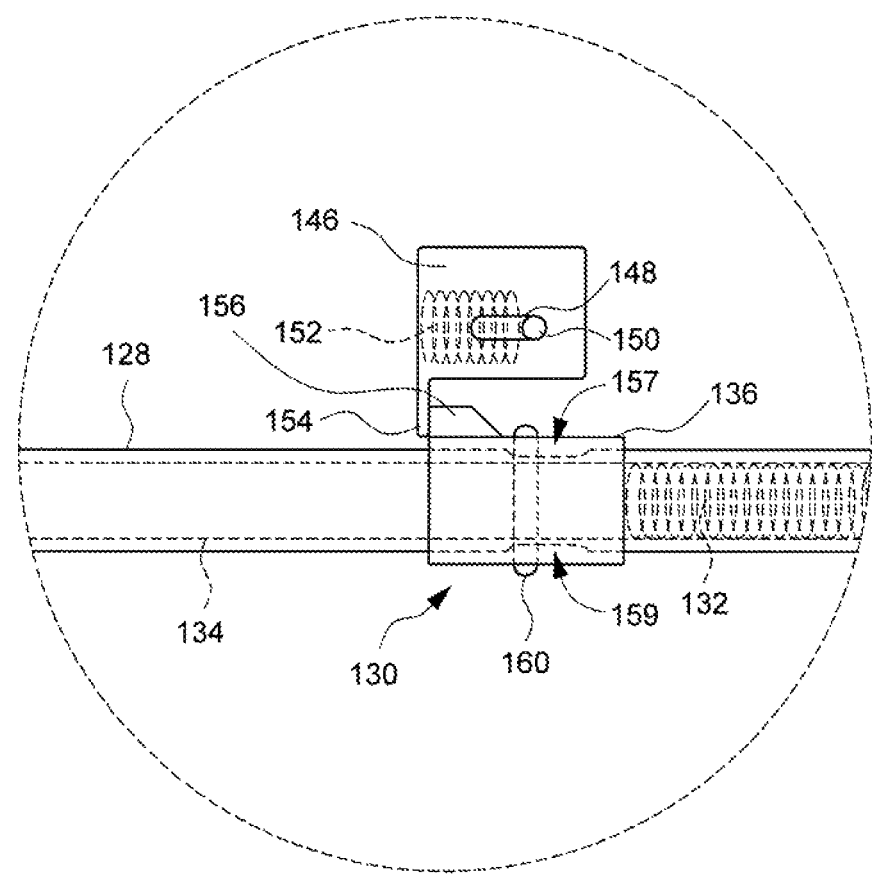
FIG. 11 is an enlarged view of a portion of FIG. 10.

FIG. 11 is an enlarged view of a portion of FIG. 10. The transversal support tube 128 can have an upper surface provided with two spaced-apart elongated slots 157, and a lower surface provided with two spaced-apart elongated slots 159 respectively aligned with the slots 157. Each connecting part 136 can be respectively affixed with one latch 134 via a fastener element 160 (e.g., rivet or the like) that is disposed through a pair of the slots 157 and 159. The fastener element 160 can slide along the slots 157 and 159 when the latch 134 and connecting part 136 are displaced transversally in unison relative to the shaft 126 and the tube 128.

Figure 12:
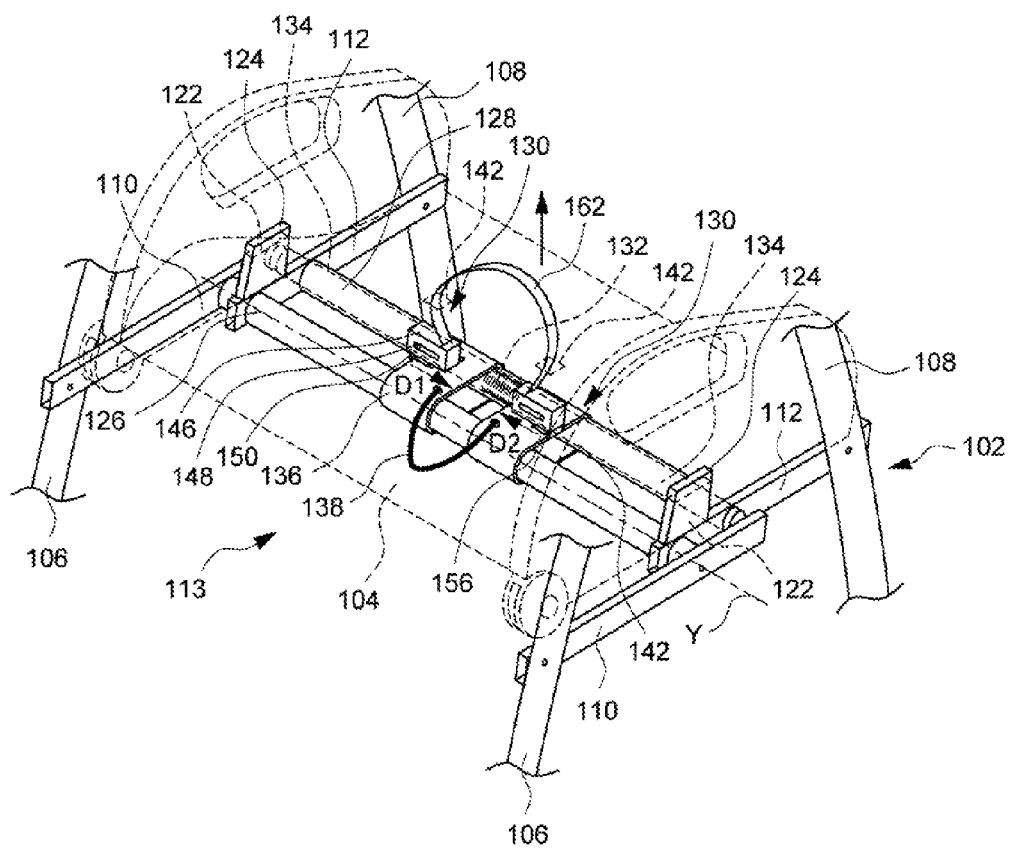
FIG. 12 is a schematic view illustrating an unlocking operation of the support frame installed with the seat.

FIG. 12 is a schematic view illustrating an unlocking operation of the support frame 102 installed with the seat 104. For facilitating the unlocking operation, the two driving parts 146 can be respectively connected with an actuator 162. According to one embodiment, the actuator 162 can be a strap. The actuator 162 can pass through the two openings 142, extend transversally above the upper surface of the seat 104, and have two opposite ends respectively affixed with the two driving parts 146. When the actuator 162 is pulled upward, the two driving parts 146 can be respectively driven to displace in the mount structures 144 in opposite directions D1 and D2 toward the center of the seat frame 113. As a result, the spring 152 can be compressed, and the two latch assemblies 130 can be driven to displace along the transversal support tube 128 in opposite directions toward the center of the seat frame 113. The latches 134 can thereby compress the spring 132 in the transversal support tube 128, and disengage from the front tube segment 110 to allow rotation of the rear tube segment 112 about the pivot axis Y relative to the front tube segment 110 to the collapsed state.

Figure 13:
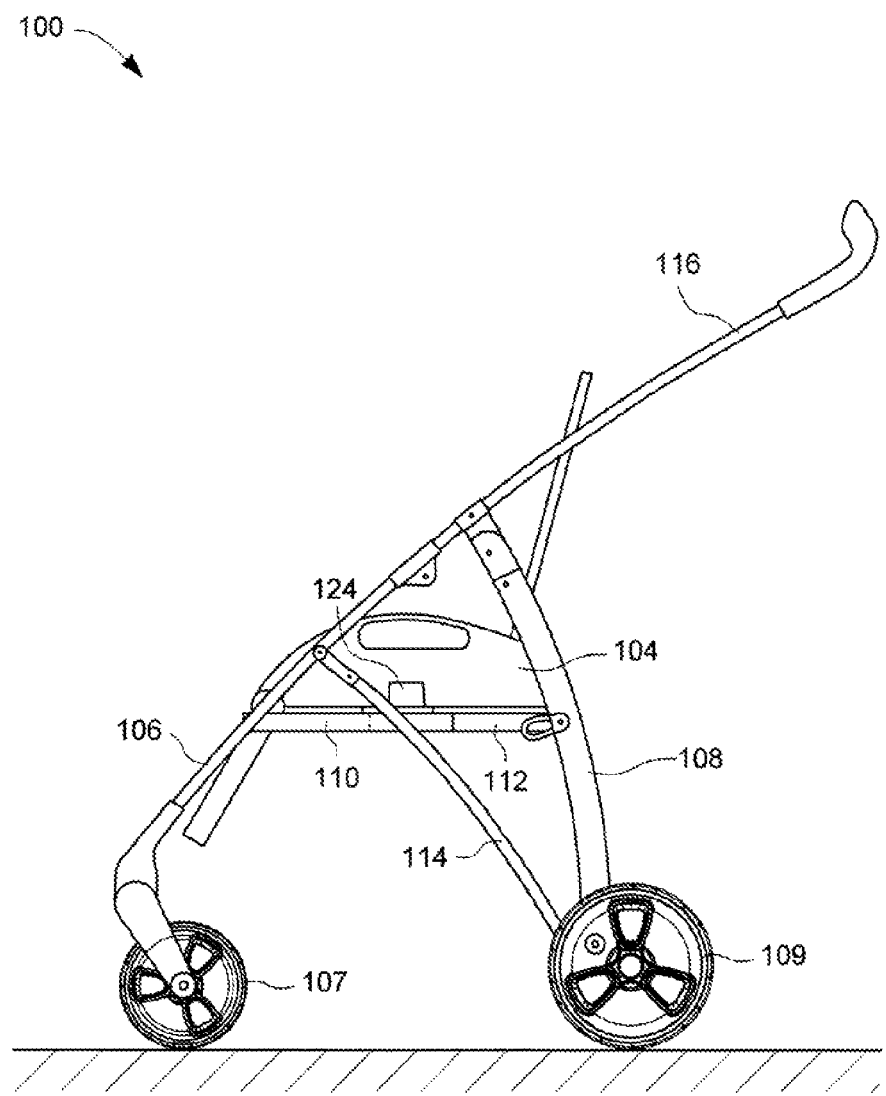
FIGS. 13 through 15 are schematic views illustrating intermediate stages in collapsing the support frame provided with the seat facing forward.
Figure 14:
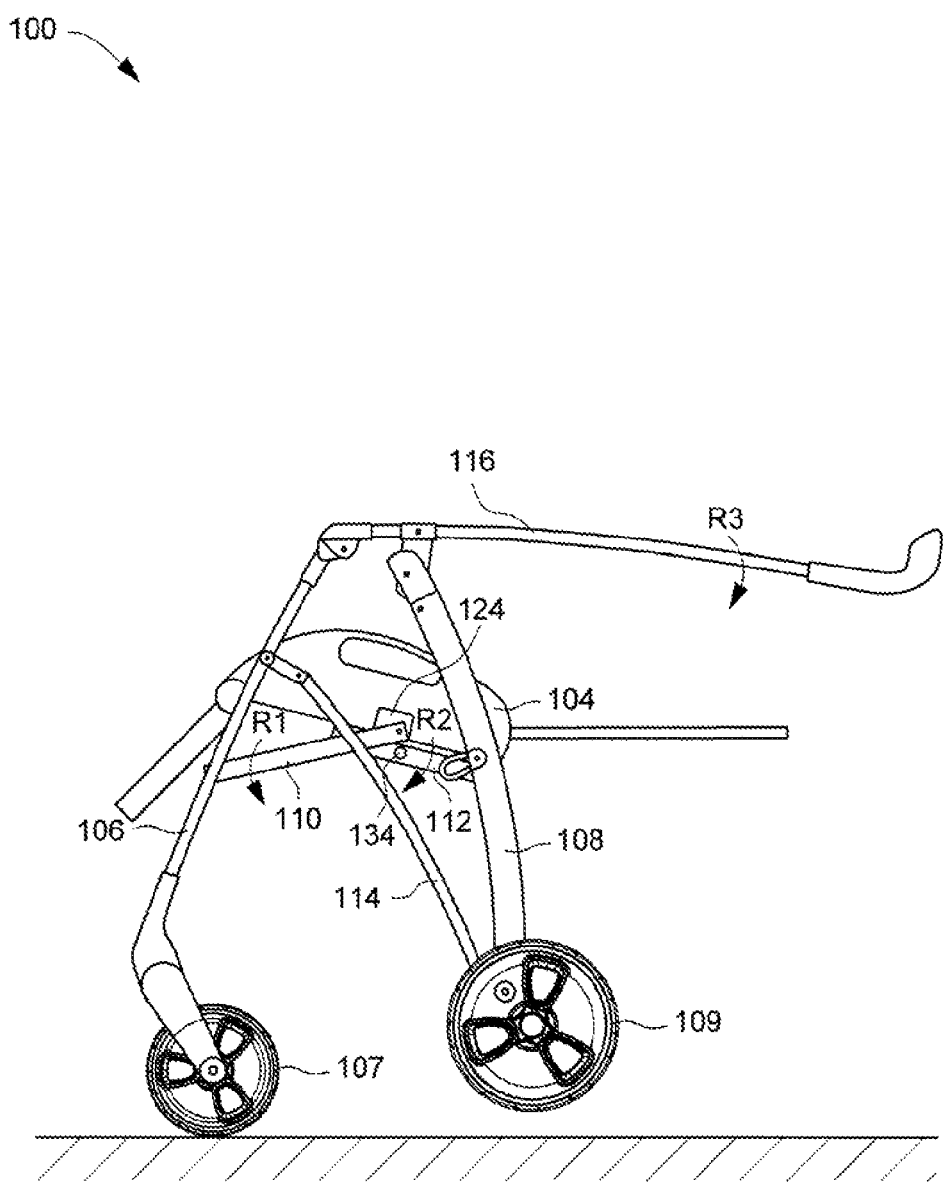
Figure 15:
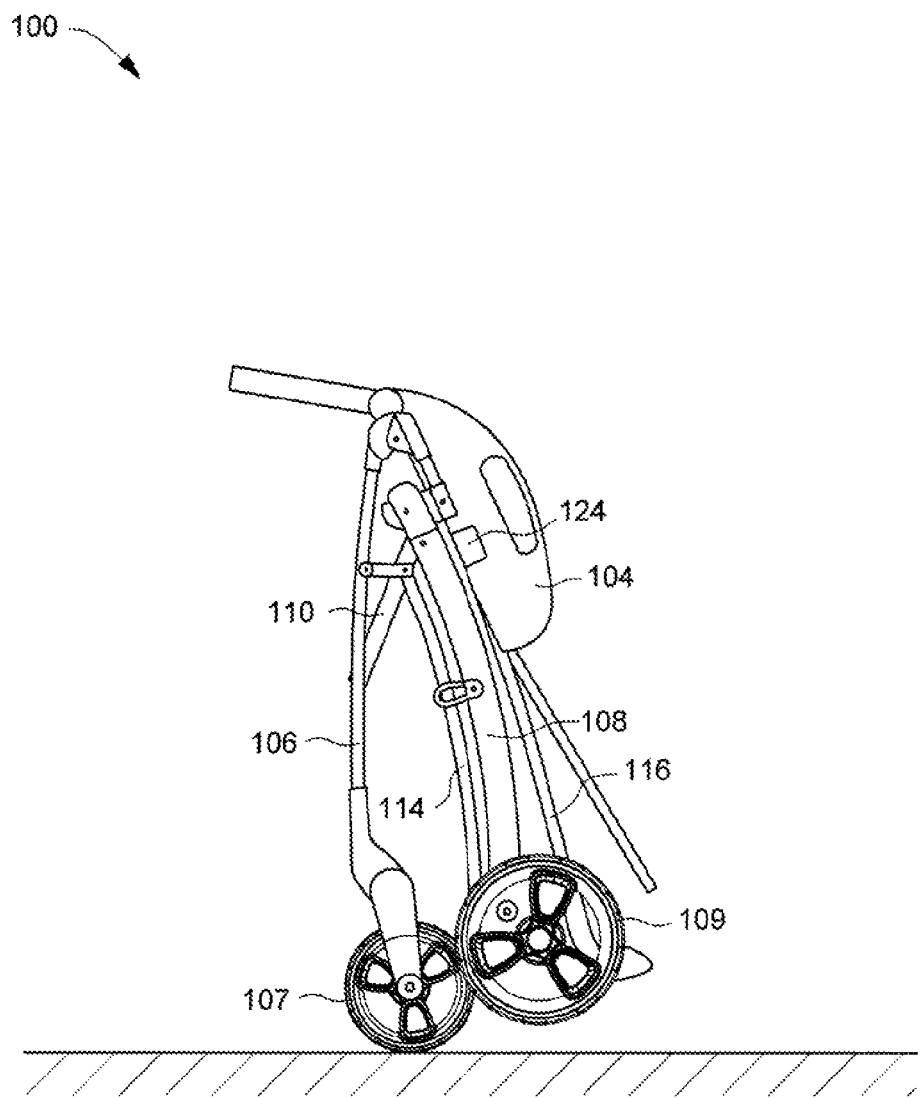

FIGS. 13 through 15 are schematic views illustrating intermediate stages in collapsing the support frame 102 provided with the seat 104 facing forward. When the actuator 162 is pulled upward, the latches 134 can be driven to disengage from the front tube segment 110. While the actuator 162 is pulled upward, the support frame 102 can also be raised above the ground, and then self collapse owing to the action of its own weight. As a result, the front tube segment 110 and the front legs 106 can rotate in the direction R1, whereas the rear tube segment 112, the rear legs 108 and the seat 104 can rotate in the direction R2 opposite to R1. Accordingly, the front and rear legs 106 and 108, the front and rear tube segments 110 and 112 and the seat 104 can collapse onto one another. While the front legs 106 are folding onto the rear legs 108, the bar linkages 114 can rotate concurrently in the direction R2, and the handle 116 can fold in the direction R3 toward the rear of the support frame 102. As shown in FIG. 15, once the infant carrier apparatus 100 is completely collapsed, the rear legs 108, the handle 116 and the bar linkages 114 can lie substantially parallel and adjacent to one another, and the folded infant carrier apparatus 100 can stand on the ground.

Figure 16:
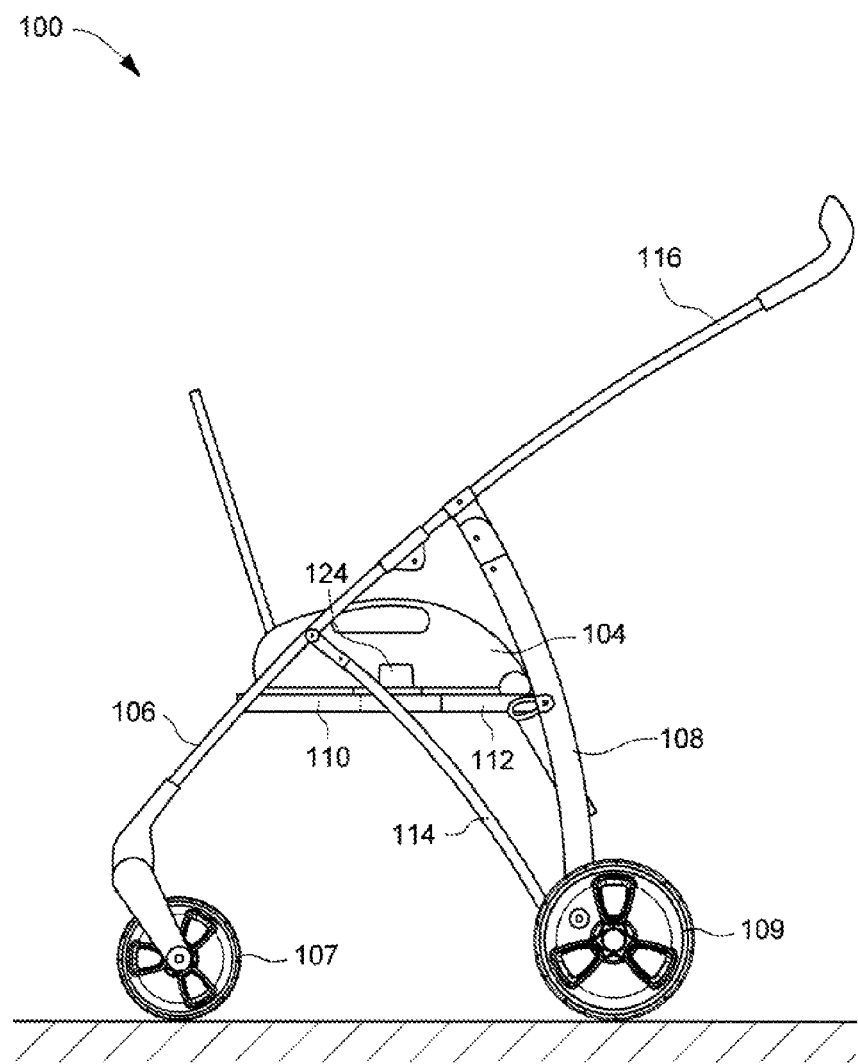
FIGS. 16 through 18 are schematic views illustrating intermediate stages in collapsing the support frame provided with the seat facing rearward.
Figure 17:
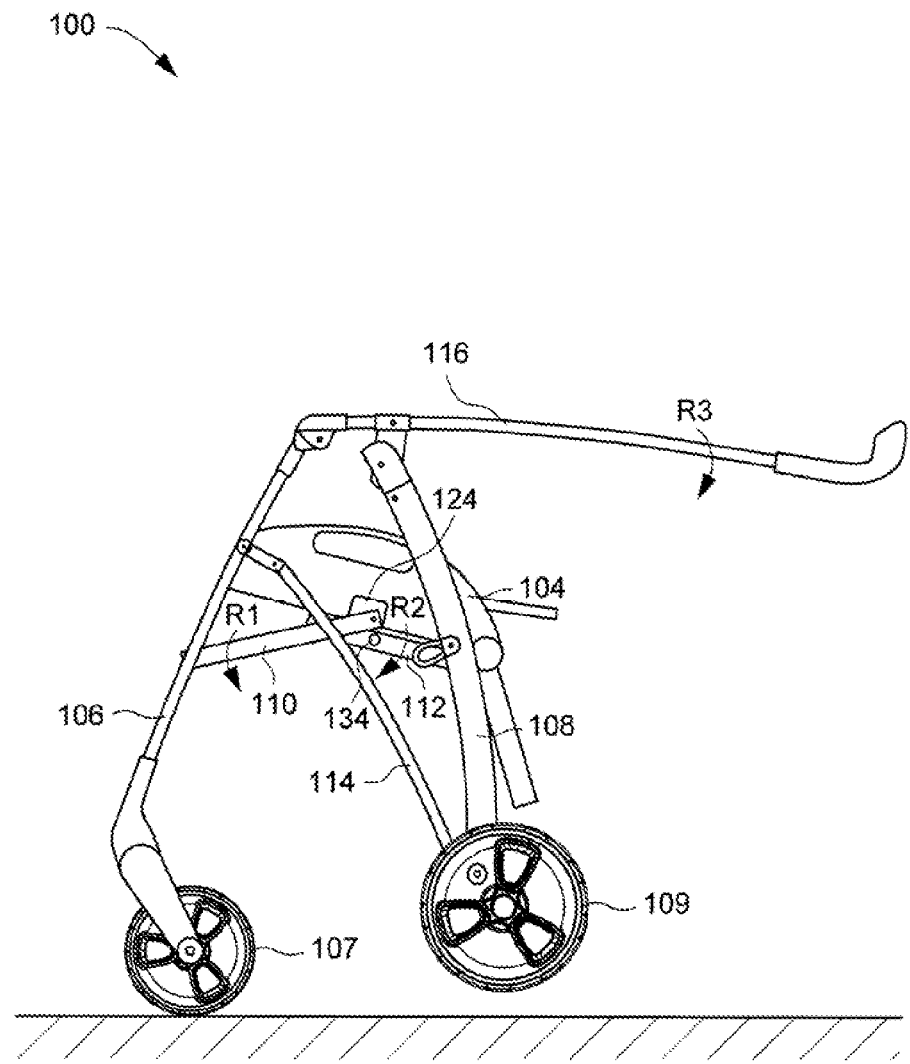
Figure 18:
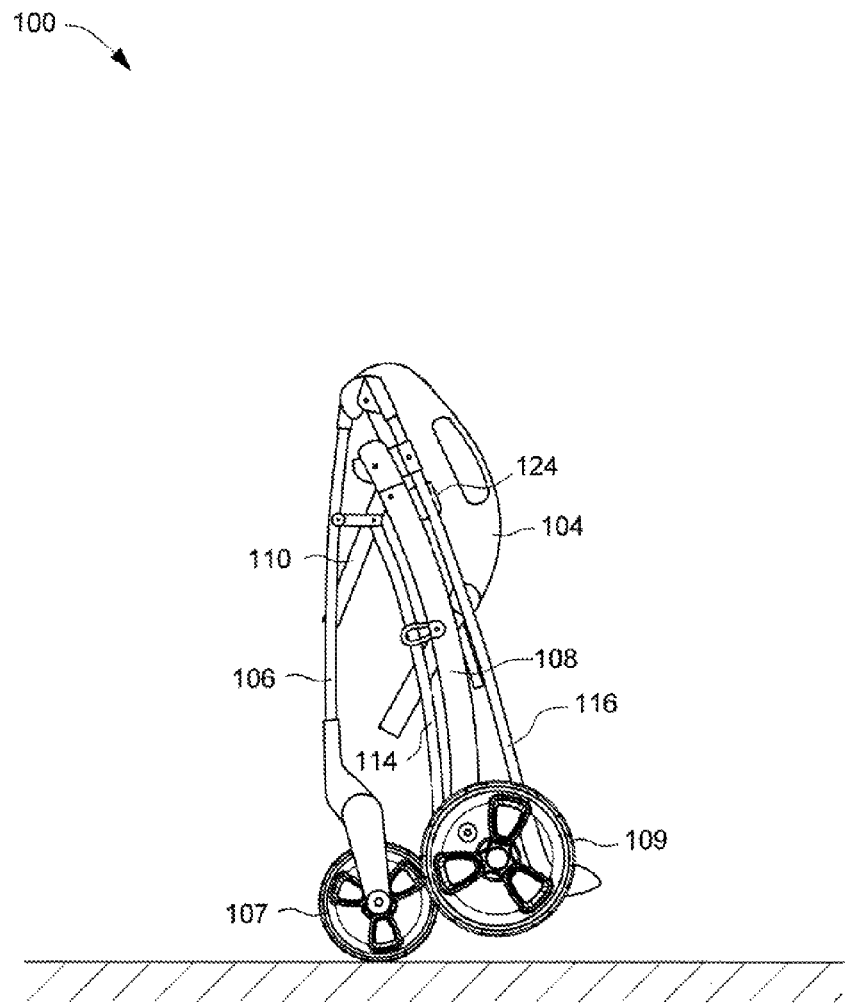

FIGS. 16 through 18 are schematic views illustrating intermediate stages in collapsing the support frame 102 provided with the seat 104 facing rearward. When the actuator 162 is pulled upward, the latches 134 can be driven to disengage from the front tube segment 110. While the actuator 162 is pulled upward, the support frame 102 can also be raised above the ground, and then self collapse owing to the action of its own weight. As a result, the front tube segment 110 and the front legs 106 can rotate in the direction R1, whereas the rear tube segment 112, the rear legs 108 and the seat 104 can rotate in the direction R2 opposite to R1. Accordingly, the front and rear legs 106 and 108, the front and rear tube segments 110 and 112 and the seat 104 can collapse onto one another. While the front legs 106 are folding onto the rear legs 108, the bar linkages 114 can rotate concurrently in the direction R2, and the handle 116 can fold in the direction R3 toward the rear of the support frame 102. As shown in FIG. 18, once the infant carrier apparatus 100 is completely collapsed, the rear legs 108, the handle 116 and the bar linkages 114 can lie substantially parallel and adjacent to one another, and the folded infant carrier apparatus 100 can stand on the ground.

The infant carrier apparatus described herein can be conveniently collapsed by a caregiver. The caregiver can use one hand to pull on the actuator extending above the seat to unlock the seat frame and then collapse the support frame. Accordingly, the caregiver can hold the child with one hand, and conveniently collapse the infant carrier apparatus with the other hand. It is worth noting that the mechanism of the detachable seat and support frame described herein may be applicable to any infant carrier apparatuses including, without limitation, infant strollers, infant high chairs, chair apparatuses, swings, etc.

Realizations of the infant carrier apparatus and operating methods thereof have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:
1. An infant carrier apparatus comprising:
 a support frame including at least one latch assembly, the latch assembly being operable between a locking state where the latch assembly locks the support frame in an unfolded state, and an unlocking state to allow folding of the support frame; and
 a seat operable to attach with and detach from the support frame, wherein the seat includes a driving part that is connected with the latch assembly when the seat is installed on the support frame and is detached from the latch assembly when the seat is removed from the support frame, and the driving part is operable to drive displacement of the latch assembly from the locking state to the unlocking state.

2. The infant carrier apparatus according to claim 1, wherein the seat includes an actuator that is connected with the driving part and extends upward from the seat, the actuator being operable to cause displacement of the driving part.

3. The infant carrier apparatus according to claim 2, wherein the actuator is a strap that extends above the seat.

4. The infant carrier apparatus according to claim 1, wherein a lower portion of the seat includes a mount structure in which is affixed a shaft, and the driving part includes two elongated slots through which the shaft passes to movably assemble in the mount structure.

5. The infant carrier apparatus according to claim 4, wherein the driving part has an interior mounted with a spring, the spring having two opposite ends respectively connected with the shaft and an inner sidewall of the driving part.

6. The infant carrier apparatus according to claim 2, wherein the latch assembly further includes a latch, and a connecting part affixed with the latch, the actuator being operable to cause displacement of the driving part, which drives unlocking movement of the latch and the connecting part.

7. The infant carrier apparatus according to claim 6, wherein the driving part includes a flange, the connecting part includes a raised portion, and the flange is adapted to contact against the raised portion to push the connecting part in movement.

8. The infant carrier apparatus according to claim 1, wherein the support frame includes a front leg, a rear leg, and a seat frame including a front and a rear tube segment pivotally connected with each other, the front tube segment further being pivotally connected with the front leg, and the rear tube segment further being pivotally connected with the rear leg.

9. The infant carrier apparatus according to claim 8, wherein the rear tube segment includes a first coupling part, and the seat includes a second coupling part that is operable to engage with the first coupling part when the seat is installed with the support frame.

10. The infant carrier apparatus according to claim 8, wherein the latch assembly when in the locking state passes through the rear tube segment and engages with the front tube segment, and the latch assembly when in the unlocking state disengages from the front tube segment.

11. The infant carrier apparatus according to claim 8, wherein the support frame further includes a bar linkage having two opposite ends respectively connected pivotally with the front and rear legs, and a handle pivotally connected with the front and rear legs, when the support frame is in the unfolded state, the bar linkage extends between the front and rear legs.

12. The infant carrier apparatus according to claim 8, wherein the support frame includes a transversal support tube that is affixed with the rear tube segment of the seat frame, the latch assembly further includes a latch and a connecting part affixed with the latch, the latch is mounted through the transversal support tube, and the connecting part and the latch are affixed with a fastener element that is movable along an elongated slot of the transversal support tube when the driving part causes displacement of the connecting part along the transversal support tube.

13. The infant carrier apparatus according to claim 12, wherein the transversal support tube has an interior mounted with a spring, the latch compressing the spring when the latch assembly is in the unlocking state.

14. The infant carrier apparatus according to claim 1, further including a second actuator that is operable to drive unlocking displacement of the latch assembly to the unlocking state when the seat is removed away from the support frame.

15. A method of operating an infant carrier apparatus, comprising:
providing a support frame including a latch assembly, the latch assembly being operable between a locking state where the latch assembly locks the support frame in an unfolded state, and an unlocking state where the latch assembly unlocks the support frame to permit its collapsing;
providing a seat having a driving part, the driving part remaining with the seat when the seat is removed from the support frame;
installing the seat on the support frame such that the driving part is connected with the latch assembly;
moving the driving part so that the driving part drives switching of the latch assembly from the locking state to the unlocking state; and
collapsing the support frame.

16. The method according to claim 15, wherein the seat includes an actuator connected with the driving part, and the step of moving the driving part includes pulling the actuator upward to cause the driving part to move toward a center of the seat.

17. The method according to claim 16, wherein the latch assembly includes a latch, and a connecting part affixed with the latch, and the step of pulling the actuator upward causes the driving part to push the latch and the connecting part in unlocking movement.

18. The method according to claim 16, wherein the support frame includes front and rear legs, and the step of pulling the actuator upward causes the front and rear tube segments to fold onto each other, which drives the front and rear legs of the support frame to collapse onto each other.

19. The method according to claim 18, wherein the front and rear legs when collapsing onto each other drive folding of a bar linkage connected between the front and rear legs.

20. An infant carrier apparatus comprising:
two front legs and two rear legs that are respectively disposed on left and right sides of the infant carrier apparatus;
two front tube segments and two rear tube segments that are respectively disposed on the left and right sides of the infant carrier apparatus to form a seat frame, the front and rear tube segments at each of the left and right sides being pivotally connected with each other, the front tube segment further being pivotally connected with the associated front leg, and the rear tube segment further being pivotally connected with the associated rear leg;
a shaft assembled with the front and rear tube segments to define a pivot axis extending transversally about which the rear tube segments are operable to rotate relative to the front tube segments;
a transversal support tube extending substantially parallel to the shaft and affixed with the two rear tube segments; and
two latch assemblies and a spring respectively mounted with the support tube, the spring being disposed between the two latch assemblies;
wherein the spring is operable to urge the latch assemblies to move transversally in opposite directions to engage the front and rear tube segments for blocking rotation of the rear tube segments relative to the front tube segments.

21. The infant carrier apparatus according to claim 20, further including an actuator operatively connected with the two latch assemblies, wherein the actuator is operable to pull the two latch assemblies to move toward each other to unlock the rear tube segments from the front tube segments and allow rotation of the rear tube segments relative to the front tube segments.

22. The infant carrier apparatus according to claim 20, wherein each of the latch assemblies respectively includes a latch mounted through an interior of the transversal support tube, the latches compressing the spring when the two latch assemblies are in an unlocking state.

* * * * *